US012745186B2

(12) United States Patent
Takahashi

(10) Patent No.: US 12,745,186 B2
(45) Date of Patent: Sep. 22, 2026

(54) USER EQUIPMENT, AND COMMUNICATION CONTROL METHOD

(71) Applicants: DENSO CORPORATION, Kariya-city (JP); TOYOTA JIDOSHA KABUSHIKI KAISHA, Toyota (JP)

(72) Inventor: Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 293 days.

(21) Appl. No.: 18/471,449

(22) Filed: Sep. 21, 2023

(65) Prior Publication Data

US 2024/0015662 A1 Jan. 11, 2024

Related U.S. Application Data

(63) Continuation of application No. PCT/JP2022/012592, filed on Mar. 18, 2022.

(30) Foreign Application Priority Data

Mar. 31, 2021 (JP) ................................ 2021-061240

(51) Int. Cl.

*H04W 52/14* (2009.01)
*H04W 52/24* (2009.01)
*H04W 56/00* (2009.01)

(52) U.S. Cl.

CPC ....... *H04W 52/146* (2013.01); *H04W 52/242* (2013.01); *H04W 56/0015* (2013.01)

(58) Field of Classification Search

None

See application file for complete search history.

(56) References Cited

U.S. PATENT DOCUMENTS

2019/0045549 A1* 2/2019 Wu ..................... H04W 72/542
2019/0306915 A1* 10/2019 Jin ........................ H04W 76/28

(Continued)

OTHER PUBLICATIONS

Huawei et al., "On Initial Active Bandwidth Part", Document R1-1717057, 3 GPP TSG RAN WG1 Meeting 90bis, Oct. 9-13, 2017.

(Continued)

*Primary Examiner* — Jenkey Van

(74) *Attorney, Agent, or Firm* — Harness, Dickey & Pierce, P.L.C.

(57) ABSTRACT

A user equipment according to an aspect of the present disclosure performs communication with a base station in a BWP that is a subset of a total bandwidth of a cell of the base station. The user equipment comprises: a communicator configured to perform the communication using an active downlink BWP used for downlink communication with the base station and an active uplink BWP used for uplink communication with the base station; and a controller configured to perform first uplink power control for calculating uplink transmission power on the active uplink BWP by using a path loss estimation value calculated based on a measurement result of received power relative to an SSB when the SSB is transmitted from the base station in the active downlink BWP. When the SSB is not transmitted in the active downlink BWP, the controller performs second uplink power control for correcting calculation of the uplink transmission power or the path loss estimation value in the first uplink power control.

9 Claims, 11 Drawing Sheets

(56) References Cited

U.S. PATENT DOCUMENTS

| | | | | |
|---|---|---|---|---|
| 2020/0296674 | A1 | 9/2020 | Kang et al. | |
| 2020/0383103 | A1 | 12/2020 | Zhou et al. | |
| 2022/0240294 | A1* | 7/2022 | Oh | H04L 1/1812 |
| 2023/0049868 | A1* | 2/2023 | Zhou | H04L 5/0098 |
| 2024/0064649 | A1* | 2/2024 | Go | H04W 52/262 |

OTHER PUBLICATIONS

R1-2100034 UE complexity reduction for RedCap, Ericsson, Jan. 25-Feb. 5, 2021.
R1-2100230 Potential solutions for UE complexity reduction, Huawei, HiSilicon, Jan. 25-Feb. 5, 2021.
R1-201214 UE complexity reduction, Samsung, Jan. 25-Feb. 5, 2021.
R1-2101766 Complexity Reduction for RedCap Devices, Qualcomm Incorporated, Jan. 25-Feb. 5, 2021.
R1-2100165 Discussion on UE complexity reduction, OPPO, Jan. 25-Feb. 5, 2021.
R1-2100499 UE complexity reduction, Nokia, Nokia Shanghai Bell, Jan. 25-Feb. 5, 2021.
3GPP TS 38.213 V16.5.0 (Mar. 2021).
3GPP TS 38.331 V16.4.1 (Mar. 2021).

* cited by examiner

FIG. 5

*PUCCH-PowerControl* information element

```
PUCCH-PowerControl ::=             SEQUENCE {
    deltaF-PUCCH-f0                    INTEGER (-16..15) OPTIONAL, -- Need R
    deltaF-PUCCH-f1                    INTEGER (-16..15) OPTIONAL, -- Need R
    deltaF-PUCCH-f2                    INTEGER (-16..15) OPTIONAL, -- Need R
    deltaF-PUCCH-f3                    INTEGER (-16..15) OPTIONAL, -- Need R
    deltaF-PUCCH-f4                    INTEGER (-16..15) OPTIONAL, -- Need R
    p0-Set                             SEQUENCE (SIZE (1..maxNrofPUCCH-P0-PerSet)) OF
P0-PUCCH                 OPTIONAL, -- Need M
    pathlossReferenceRSs               SEQUENCE (SIZE (1..maxNrofPUCCH-
PathlossReferenceRSs)) OF PUCCH-PathlossReferenceRS

OPTIONAL, -- Need M
    twoPUCCH-PC-AdjustmentStates       ENUMERATED {twoStates} OPTIONAL, -- Need S
    ...,
    [[
    pathlossReferenceRSs-v1610         SetupRelease { PathlossReferenceRSs-v1610 }
OPTIONAL -- Need M
    ]],
    [[
   powerOffsetNonSSB-BWP-r17             ENUMERATED {dB-12, dB-9, dB-6, dB-3, dB0, dB3}
                              OPTIONAL      -- Need R
    ]]
}
...
```

| *P0-PUCCH* field descriptions |
| --- |
| *powerOffsetNonSSB-BWP*<br>Provides the power offset of the active DL BWP without SSB relative to the initial DL BWP, unit in dB. Value dB-12 corresponds to -12 dB, dB-10 corresponds to -9 dB and so on. See TS 38.213 [13], clause 7.1.1. |

FIG. 6

*PUSCH-PowerControl* information element

```
PUSCH-PowerControl-v1610 ::=         SEQUENCE {
    pathlossReferenceRSToAddModList2-r16   SEQUENCE (SIZE (1..maxNrofPUSCH-
PathlossReferenceRSsDiff-r16)) OF PUSCH-PathlossReferenceRS-r16

OPTIONAL, -- Need N
    pathlossReferenceRSToReleaseList2-r16  SEQUENCE (SIZE (1..maxNrofPUSCH-
PathlossReferenceRSsDiff-r16)) OF PUSCH-PathlossReferenceRS-Id-v1610

OPTIONAL, -- Need N
    p0-PUSCH-SetList-r16                SEQUENCE (SIZE (1..maxNrofSRI-PUSCH-Mappings)) OF
P0-PUSCH-Set-r16      OPTIONAL, -- Need R
    olpc-ParameterSet                   SEQUENCE {
        olpc-ParameterSetDCI-0-1-r16        INTEGER (1..2)
OPTIONAL, -- Need R
        olpc-ParameterSetDCI-0-2-r16        INTEGER (1..2)
OPTIONAL  -- Need R
    }
OPTIONAL, -- Need M
    ...,
   [[
   powerOffsetNonSSB-BWP-r17          ENUMERATED {dB-12, dB-9, dB-6, dB-3, dB0, dB3}
                      OPTIONAL     -- Need R
   ]]
}
...
```

| *PUSCH-PowerControl* field descriptions |
| --- |
| ***powerOffsetNonSSB-BWP***<br>Provides the power offset of the active DL BWP without SSB relative to the initial DL BWP, unit in dB. Value dB-12 corresponds to -12 dB, dB-10 corresponds to -9 dB and so on. See TS 38.213 [13], clause 7.1.1. |

FIG. 7

*SRS-Config* information element

```
SRS-Config ::=                         SEQUENCE {
  srs-ResourceSetToReleaseList           SEQUENCE (SIZE(1..maxNrofSRS-ResourceSets)) OF SRS-
ResourceSetId                 OPTIONAL,    -- Need N
  srs-ResourceSetToAddModList            SEQUENCE (SIZE(1..maxNrofSRS-ResourceSets)) OF SRS-
ResourceSet                   OPTIONAL,    -- Need N
  srs-ResourceToReleaseList              SEQUENCE (SIZE(1..maxNrofSRS-Resources)) OF SRS-ResourceId
OPTIONAL,    -- Need N
  srs-ResourceToAddModList               SEQUENCE (SIZE(1..maxNrofSRS-Resources)) OF SRS-Resource
OPTIONAL,    -- Need N
  tpc-Accumulation                       ENUMERATED {disabled} OPTIONAL,    -- Need S
  ...,
  [[  srs-RequestDCI-1-2-r16                 INTEGER (1..2)  OPTIONAL, -- Need S
  srs-RequestDCI-0-2-r16                 INTEGER (1..2)  OPTIONAL, -- Need S
  srs-ResourceSetToAddModListDCI-0-2-r16 SEQUENCE (SIZE(1..maxNrofSRS-ResourceSets)) OF SRS-
ResourceSet           OPTIONAL, -- Need N
  srs-ResourceSetToReleaseListDCI-0-2-r16 SEQUENCE (SIZE(1..maxNrofSRS-ResourceSets)) OF SRS-
ResourceSetId         OPTIONAL, -- Need N  ...]]}

SRS-ResourceSet ::=                    SEQUENCE {
  srs-ResourceSetId                      SRS-ResourceSetId,
  srs-ResourceIdList                     SEQUENCE (SIZE(1..maxNrofSRS-ResourcesPerSet)) OF SRS-
ResourceId    OPTIONAL, -- Cond Setup
  resourceType                           CHOICE {...  },
  usage                                  ENUMERATED {beamManagement, codebook, nonCodebook,
antennaSwitching},
  alpha                                  Alpha   OPTIONAL, -- Need S
  p0                                     INTEGER (-202..24) OPTIONAL, -- Cond Setup
  pathlossReferenceRS                    PathlossReferenceRS-Config OPTIONAL, -- Need M
  srs-PowerControlAdjustmentStates     ENUMERATED { sameAsFci2, separateClosedLoop} OPTIONAL, -- Need S
  ...,
  [[  pathlossReferenceRSList-r16    SetupRelease { PathlossReferenceRSList-r16} OPTIONAL  -- Need M]],
  [[
  powerOffsetNonSSB-BWP-r17          ENUMERATED {dB-12, dB-9, dB-6, dB-3, dB0, dB3} OPTIONAL -- Need R
  ]]
...
```

| *SRS-ResourceSet* field descriptions |
| --- |
| ***powerOffsetNonSSB-BWP***<br>Provides the power offset of the active DL BWP without SSB relative to the initial DL BWP, unit in dB. Value dB-12 corresponds to -12 dB, dB-10 corresponds to -9 dB and so on. See TS 38.213 [13], clause 7.1.1. |

FIG. 8

*PUCCH-PowerControl* information element

```
PUCCH-PowerControl ::=              SEQUENCE {
...
    p0-Set                              SEQUENCE (SIZE (1..maxNrofPUCCH-P0-PerSet)) OF P0-PUCCH
OPTIONAL, -- Need M
    pathlossReferenceRSs                SEQUENCE (SIZE (1..maxNrofPUCCH-PathlossReferenceRSs)) OF
PUCCH-PathlossReferenceRS    OPTIONAL, -- Need M
    twoPUCCH-PC-AdjustmentStates        ENUMERATED {twoStates} OPTIONAL, -- Need S
    ...,
    [[
    pathlossReferenceRSs-v1610          SetupRelease { PathlossReferenceRSs-v1610 }
OPTIONAL -- Need M
    ]],
   [[
   pathlossReferenceRSs-r17            SetupRelease { PathlossReferenceRSs-r17 }
OPTIONAL -- Need M
   ]]
}
...
PathlossReferenceRSs-r17 ::=          SEQUENCE (SIZE (1..maxNrofPUCCH-PathlossReferenceRSs-r16))
OF PUCCH-PathlossReferenceRS-r17
...
PUCCH-PathlossReferenceRS-r17 ::=        SEQUENCE {
    pucch-PathlossReferenceRS-Id-r17       PUCCH-PathlossReferenceRS-Id-v1610,
    referenceSignal-r17                    CHOICE {
      ssb-r17                                   ENUMERATED {
        ssb-Index-r17                              SSB-Index,
        powerOffsetNonSSB-BWP-r17                  ENUMERATED {dB-12, dB-9, dB-6, dB-3, dB0, dB3}
   OPTIONAL    -- Need R
      },
        csi-RS-r17                                   NZP-CSI-RS-ResourceId
    }
...
```

| *PUCCH-PowerControl* field descriptions |
| --- |
| ***powerOffsetNonSSB-BWP***<br>Provides the power offset of the active DL BWP without SSB relative to the initial DL BWP, unit in dB. Value dB-12 corresponds to -12 dB, dB-10 corresponds to -9 dB and so on. See TS 38.213 [13], clause 7.1.1. |

FIG. 9

*PUSCH-PowerControl* information element

```
PUCCH-PowerControl ::=              SEQUENCE {
...
    p0-Set                                   SEQUENCE (SIZE (1..maxNrofPUCCH-P0-PerSet)) OF P0-
PUCCH                  OPTIONAL, -- Need M
    pathlossReferenceRSs                     SEQUENCE (SIZE (1..maxNrofPUCCH-PathlossReferenceRSs))
OF PUCCH-PathlossReferenceRS  OPTIONAL, -- Need M
    twoPUCCH-PC-AdjustmentStates             ENUMERATED {twoStates} OPTIONAL, -- Need S
    ...,
    [[    pathlossReferenceRSs-v1610          SetupRelease { PathlossReferenceRSs-v1610 }
OPTIONAL -- Need M  ]],
     [[  pathlossReferenceRSs-r17           SetupRelease { PathlossReferenceRSs-r17 }
OPTIONAL --- Need M  ]]}
...

PathlossReferenceRSs-r17 ::=          SEQUENCE (SIZE (1..maxNrofPUCCH-PathlossReferenceRSs-
r16)) OF PUCCH-PathlossReferenceRS-r17

PUCCH-PathlossReferenceRS-r17 ::=                        SEQUENCE {
    pucch-PathlossReferenceRS-Id-r17                         PUCCH-PathlossReferenceRS-Id-v1610,
    referenceSignal-r17                                      CHOICE {
      ssb-r17                                  ENUMERATED {
        ssb-Index-r17                                            SSB-Index,
        powerOffsetNonSSB-BWP-r17                        ENUMERATED {dB-12, dB-9, dB-6, dB-3, dB0,
dB3}    OPTIONAL   -- Need R
      },
        csi-RS-r17                                           NZP-CSI-RS-ResourceId
    }
}
...
```

| *PUSCH-PowerControl* field descriptions |
| --- |
| ***powerOffsetNonSSB-BWP***<br>Provides the power offset of the active DL BWP without SSB relative to the initial DL BWP, unit in dB. Value dB-12 corresponds to -12 dB, dB-10 corresponds to -9 dB and so on. See TS 38.213 [13], clause 7.1.1. |

FIG. 10

*SRS-Config* information element

```
RS-Config ::=                          SEQUENCE {
    srs-ResourceSetToReleaseList            SEQUENCE (SIZE(1..maxNrofSRS-ResourceSets)) OF SRS-
ResourceSetId               OPTIONAL,    -- Need N
    srs-ResourceSetToAddModList             SEQUENCE (SIZE(1..maxNrofSRS-ResourceSets)) OF SRS-
ResourceSet                 OPTIONAL,    -- Need N
...
    srs-ResourceSetToAddModListDCI-0-2-r16  SEQUENCE (SIZE(1..maxNrofSRS-ResourceSets)) OF SRS-
ResourceSet         OPTIONAL, -- Need N
    srs-ResourceSetToReleaseListDCI-0-2-r16 SEQUENCE (SIZE(1..maxNrofSRS-ResourceSets)) OF SRS-
ResourceSetId       OPTIONAL, -- Need N
...

SRS-ResourceSet ::=                     SEQUENCE {
...
   [[ pathlossReferenceRSList-r17             SetupRelease { PathlossReferenceRSList-r17}
OPTIONAL  -- Need M  ]]
}

PathlossReferenceRS-Config-r17 ::=   CHOICE {
   ssb-r17                               ENUMERATED {
      ssb-Index-r17                        SSB-Index,
      powerOffsetNonSSB-BWP-r17                ENUMERATED {dB-12, dB-9, dB-6, dB-3, dB0, dB3}
   OPTIONAL     -- Need R
   },
   csi-RS-r17                          NZP-CSI-RS-ResourceId
}

PathlossReferenceRSList-r17 ::=             SEQUENCE (SIZE (1..maxNrofSRS-PathlossReferenceRS-r16)) OF
PathlossReferenceRS-r17

PathlossReferenceRS-r17 ::=                 SEQUENCE {
    srs-PathlossReferenceRS-Id-r17              SRS-PathlossReferenceRS-Id-r16,
    pathlossReferenceRS-r17                     PathlossReferenceRS-Config-r17
}
...
```

| *SRS-ResourceSet* field descriptions |
| --- |
| ***powerOffsetNonSSB-BWP***<br>Provides the power offset of the active DL BWP without SSB relative to the initial DL BWP, unit in dB. Value dB-12 corresponds to -12 dB, dB-10 corresponds to -9 dB and so on. See TS 38.213 [13], clause 7.1.1. |

USER EQUIPMENT, AND COMMUNICATION CONTROL METHOD

CROSS-REFERENCE TO RELATED APPLICATIONS

The present application is a continuation application of International Patent Application No. PCT/JP2022/012592, filed Mar. 18, 2022, which designated the U.S., and claims the benefit of priority to Japanese Patent Application No. 2021-061240, filed on Mar. 31, 2021. The entire disclosures of the above applications are incorporated herein by reference.

TECHNICAL FIELD

The present disclosure relates to a user equipment, and a communication control method used in a mobile communication system.

BACKGROUND ART

In a fifth generation (5G) mobile communication system (5G system), communication between user equipment and a base station using a bandwidth part (BWP) that is a subset of a total bandwidth of a cell is defined. The user equipment performs communication by using a BWP (hereinafter, active BWP) used for communication with the base station. In the user equipment, a plurality of the BWPs can be configured for each of a downlink communication BWP (hereinafter, a downlink BWP) and an uplink communication BWP (hereinafter, an uplink BWP). The user equipment switches and uses the active BWP in a case where the plurality of BWPs is configured.

The base station transmits a synchronization signal and a physical broadcast channel block (hereinafter, SSB) that are used by the user equipment to measure radio quality. The user equipment performs measurement based on the SSB received from the base station. The user equipment uses a measurement result obtained by the measurement for communication control with the base station. For example, the user equipment calculates a path loss estimation value from the measurement result of a received power relative to the SSB. The user equipment can calculate an uplink transmission power used for uplink communication with the base station in an active uplink BWP corresponding to an active downlink BWP by using the calculated path loss estimation value.

In recent years, in 3GPP which is a mobile communication system standardization project, it has been studied to provide user equipment (so-called Reduced Capable UE) with limited communication capability in a 5G system. Since such the user equipment does not have multiple receivers, it is not possible to perform measurement on SSB transmitted at frequencies other than an active BWP during communication in the active BWP. For this reason, it is conceivable to configure a BWP in which the SSB is transmitted to the user equipment with limited communication capability; however, the BWP in which the SSB is transmitted is restricted. Concentration of a large number of user equipment in such a restricted BWP may cause traffic congestion.

In order to avoid traffic congestion, it is desirable to be able to configure a BWP in which no SSB is transmitted in the total bandwidth in the user equipment (See, for example, Non Patent Literature 1). Even in user equipment in which a BWP in which an SSB is not transmitted is configured, it is possible to receive an SSB transmitted at a frequency other than the active BWP and perform measurement by using a measurement gap configured in the user equipment.

CITATION LIST

Non Patent Literature

Non Patent Literature 1: 3GPP Contribution "R1-2100230"

SUMMARY OF INVENTION

However, when the SSB is not transmitted in the active downlink BWP, the user equipment cannot measure a radio quality, and thus cannot calculate a path loss estimation value. Accordingly, in a case where the user equipment performs the uplink communication with the base station in the active uplink BWP corresponding to the active downlink BWP in which the SSB is not transmitted, there is a possibility that the user equipment cannot calculate appropriate uplink transmission power.

Therefore, an object of the present disclosure is to provide a user equipment and a communication control method capable of appropriately calculating uplink transmission power used for uplink communication with a base station in an active uplink BWP corresponding to an active downlink BWP in which an SSB is not transmitted.

A user equipment according to an aspect of the present disclosure performs communication with a base station in a BWP that is a subset of a total bandwidth of a cell of the base station. The user equipment comprises: a communicator configured to perform the communication using an active downlink BWP used for downlink communication with the base station and an active uplink BWP used for uplink communication with the base station; and a controller configured to perform first uplink power control for calculating uplink transmission power in the active uplink BWP by using a path loss estimation value calculated based on a measurement result of received power relative to an SSB when the SSB is transmitted from the base station in the active downlink BWP. When the SSB is not transmitted in the active downlink BWP, the controller performs second uplink power control for correcting calculation of the uplink transmission power or the path loss estimation value in the first uplink power control.

A communication control method according to an aspect of the present disclosure is executed by a user equipment configured to perform communication with a base station in a BWP that is a subset of a total bandwidth of a cell of the base station. The communication control method comprises the steps of: performing the communication using an active downlink BWP used for downlink communication with the base station and an active uplink BWP used for uplink communication with the base station; when an SSB is transmitted from the base station in the active downlink BWP, performing first uplink power control for calculating uplink transmission power in the active uplink BWP by using a path loss estimation value calculated based on a measurement result of received power relative to the SSB; and when the SSB is not transmitted in the active downlink BWP, performing second uplink power control for correcting calculation of the uplink transmission power or the path loss estimation value in the first uplink power control.

BRIEF DESCRIPTION OF DRAWINGS

FIG. 5 is a specification modification example (example 1) according to operation example 1 in the embodiment of the present disclosure.

FIG. 6 is a specification modification example (example 2) according to operation example 1 in the embodiment of the present disclosure.

FIG. 7 is a specification modification example (example 3) according to operation example 1 in the embodiment of the present disclosure.

FIG. 8 is a specification modification example (example 4) according to operation example 1 in the embodiment of the present disclosure.

FIG. 9 is a specification modification example (example 5) according to operation example 1 in the embodiment of the present disclosure.

FIG. 10 is a specification modification example (example 6) according to operation example 1 in the embodiment of the present disclosure.

DESCRIPTION OF EMBODIMENTS

Figure 1:
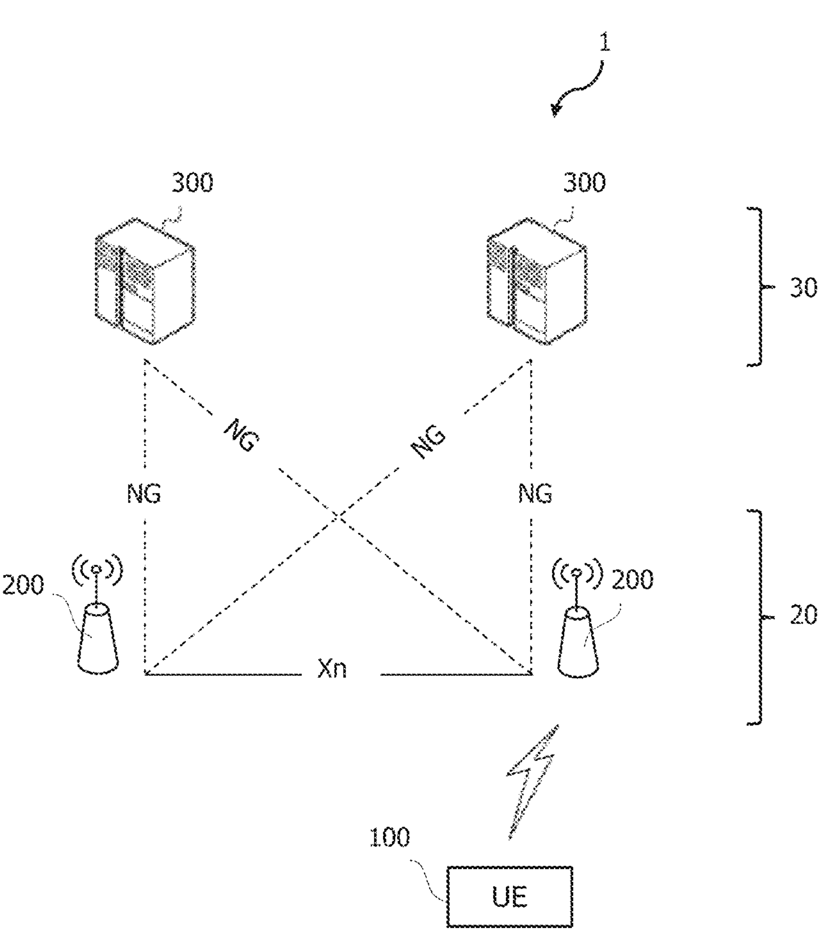
FIG. 1 is an explanatory diagram illustrating an example of a schematic configuration of a system according to an embodiment of the present disclosure.

Hereinafter, embodiments of the present disclosure will be described in detail with reference to the accompanying drawings. Note that, in the present specification and the drawings, elements that can be described in a similar manner are denoted by the same or similar reference numerals, and redundant description can be omitted.

(1) System Configuration (1.1) System Overview

An example of a configuration of a system 1 according to an embodiment of the present disclosure will be described with reference to FIG. 1. The system 1 is, for example, a mobile communication system conforming to technical specifications (Technical specification (TS)) of 3GPP which is a mobile communication system standardization project. Hereinafter, as the system 1, a 5th generation system (5th Generation System (5GS)) of the 3GPP standard, that is, a mobile communication system based on NR (New Radio) will be described as an example. Note that the system 1 is not limited to this example. The system 1 may be a system conforming to a TS of LTE (Long Term Evolution) or another generation system (for example, the sixth generation) of the 3GPP standard. The system 1 may be a system conforming to TS of a standard other than the 3GPP standard.

As illustrated in FIG. 1, a system 1 includes a 5G radio access network (so-called Next Generation Radio Access Network (NG-RAN)) 20, a 5G core network (5G Core Network (5GC)) 30, and user equipment (User Equipment (UE)) 100.

The NG-RAN 20 includes a base station (Base Station (BS)) 200 that is a node of a radio access network. The BS 200 may communicate with a UE 100 located within a coverage area of the BS 200. The BS 200 communicates with the UE 100 using, for example, a protocol stack of the RAN. The protocol stack includes, for example, a RRC (Radio Resource Control) layer, a SDAP (Service Data Adaptation Protocol) layer, a PDCP (Packet Data Convergence Protocol) layer, a RLC (Radio Link Control) layer, a MAC (Medium Access Control) layer, and a physical (Physical (PHY)) layer. However, in the case of LTE, there may be no SDAP layer.

The BS 200 is, for example, a gNB that provides an NR user plane and control plane protocol terminations towards the UE 100 and is connected to the 5GC 30 via an NG interface. Note that the BS 200 may be, for example, an eNB that provides E-UTRA user plane and control plane protocol terminations toward the UE 100 in LTE.

The BS 200 may include a plurality of units. The plurality of units may include a first unit that hosts a higher layer (higher layer) included in the protocol stack and a second unit that hosts a lower layer (lower layer) included in the protocol stack. The higher layer may include an RRC layer, an SDAP layer, and a PDCP layer, and the lower layer may include an RLC layer, a MAC layer, and a PHY layer. The first unit may be a CU (Central Unit), and the second unit may be a DU (Distributed Unit). The plurality of units may include a third unit that performs processing below the PHY layer. The second unit may perform processing above the PHY layer. The third unit may be a RU (Radio Unit). The BS 200 may be one of the plurality of units and may be connected to another unit of the plurality of units. Furthermore, the BS 200 may be an IAB (Integrated Access and Backhaul) donor or an IAB node.

The 5GC 30 includes a core network apparatus 300. The core network apparatus 300 includes, for example, an AMF (Access and Mobility Management Function) and/or a UPF (User Plane Function). The AMF performs mobility management of the UE 100. The UPF provides a function specialized for U-plane processing. The AMF and the UPF are connected to the BS 200 via an NG interface.

The UE 100 may communicate with the BS 200 when located within the coverage area of the BS 200. The UE 100 may communicate with the BS 200 using the protocol stack described above.

The UE 100 is a communication apparatus that communicates via the base station 200. The UE 100 may be an apparatus used by a user. The UE 100 is, for example, a mobile radio communication apparatus such as a mobile phone terminal such as a smartphone, a tablet terminal, a notebook PC, a communication module, or a communication card. Furthermore, the UE 100 may be a vehicle (for example, a car, a train, or the like) or an apparatus provided in the vehicle. The UE 100 may be a transport body other than a vehicle (for example, a ship, an airplane, or the like) or an apparatus provided in the transport body other than a vehicle. Furthermore, the UE 100 may be a sensor or an apparatus provided in the sensor. Note that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

The UE 100 may be user equipment (so-called reduced capability NR device (RedCap UE)) with limited communication capability. The RedCap UE may be, for example, a UE with reduced equipment cost and complexity as compared with UEs that meet Rel-15 or Rel-16 high performance, enhanced mobile broadband (enhanced Mobile Broadband (eMBB)) and ultra-reliable low latency (ultra-reliable and low latency communications (URLLC)). The RedCap UE may be capable of communicating at a communication speed higher than or equal to a communication speed defined by a LPWA (Low Power Wide Area) standard (for example, LTE Cat.1/1bis, LTECat.M1 (LTE-M), LTE-Cat.NB1 (NB-IoT)). The RedCap UE may be communicable with a bandwidth greater than or equal to the bandwidth specified in the LPWA standard. The RedCap UE may have a limited bandwidth used for communication as compared with the UE of Rel-15 or Rel-16. In FR1 (Frequency Range 1), for example, the maximum bandwidth of the RedCap UE may be 20 MHz, and may be 40 MHz under predetermined conditions. In FR2 (Frequency Range 2), for example, the maximum bandwidth of the RedCap UE may be 100 MHz. The RedCap UE may have only one receiver (so-called Rx chain) that receives a radio signal. The RedCap UE may be, for example, an industrial wireless sensor, a video surveillance apparatus, or a wearable apparatus.

(1.2) Configuration of User Equipment

Figure 2:
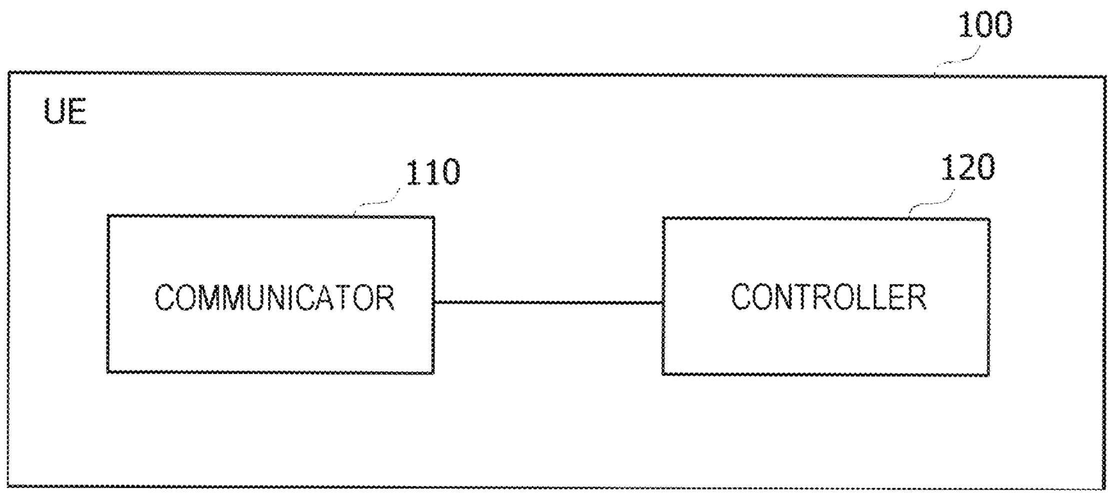
FIG. 2 is a block diagram illustrating an example of a schematic functional configuration of user equipment according to an embodiment of the present disclosure.

An example of a configuration of the UE 100 according to the embodiment of the present disclosure will be described with reference to FIG. 2. The UE 100 includes a communicator 110 and a controller 120.

The communicator 110 communicates with other communication apparatuses by transmitting and receiving signals. For example, the communicator 110 receives a radio signal from the BS 200 and transmits a radio signal to the BS 200. Furthermore, for example, the communicator 110 may receive a radio signal from another UE and transmit a radio signal to another UE.

The communicator 110 may include one or more receivers that receive radio signals and one or more transmitters that transmit radio signals. Hereinafter, a configuration in which the communicator 110 includes only one receiver is mainly assumed. The receiver and the transmitter may include an antenna and an RF circuit. The antenna converts a signal into a radio wave and emits the radio wave into space. Furthermore, the antenna receives a radio wave in space and converts the radio wave into a signal. The antenna may include a transmitting antenna and a receiving antenna. The antenna may include an antenna for transmission and reception. The antenna may include a plurality of antenna elements. The RF circuit performs analog processing of a signal transmitted and received via the antenna. The RF circuit may include a high frequency filter, an amplifier, a modulator, a low pass filter, and the like.

The controller 120 performs various controls in the UE 100. The controller 120 controls, for example, communication with the BS 200 or another UE 100 via the communicator 110. An operation of the UE 100 to be described later may be an operation under the control of the controller 120.

The controller 120 may include one or more processors capable of executing a program, and a memory that stores the program. The one or more processors may execute the program to perform the operation of the controller 120. The program may be a program for causing the processor to execute the operation of the controller 120.

The processor performs digital processing of signals transmitted and received via the antenna and the RF circuit. The digital processing includes processing of a protocol stack of the RAN. The processor may be a single processor. The processor may include a plurality of processors. The plurality of processors may include a baseband processor that performs digital processing and one or more processors that perform other processing. The memory stores a program executed by the processor, a parameter related to the program, and data related to the program. The memory may include at least one of a ROM (Read Only Memory), an EPROM (Erasable Programmable Read Only Memory), an EEPROM (Electrically Erasable Programmable Read Only Memory), a RAM (Random Access Memory), and a flash memory. All or a part of the memory may be included in the processor.

Note that, in the following, an operation of a functional unit (specifically, the communicator 110 and the controller 120) included in the UE 100 may be described as an operation of the UE 100.

(1.3) Configuration of Base Station

Figure 3:
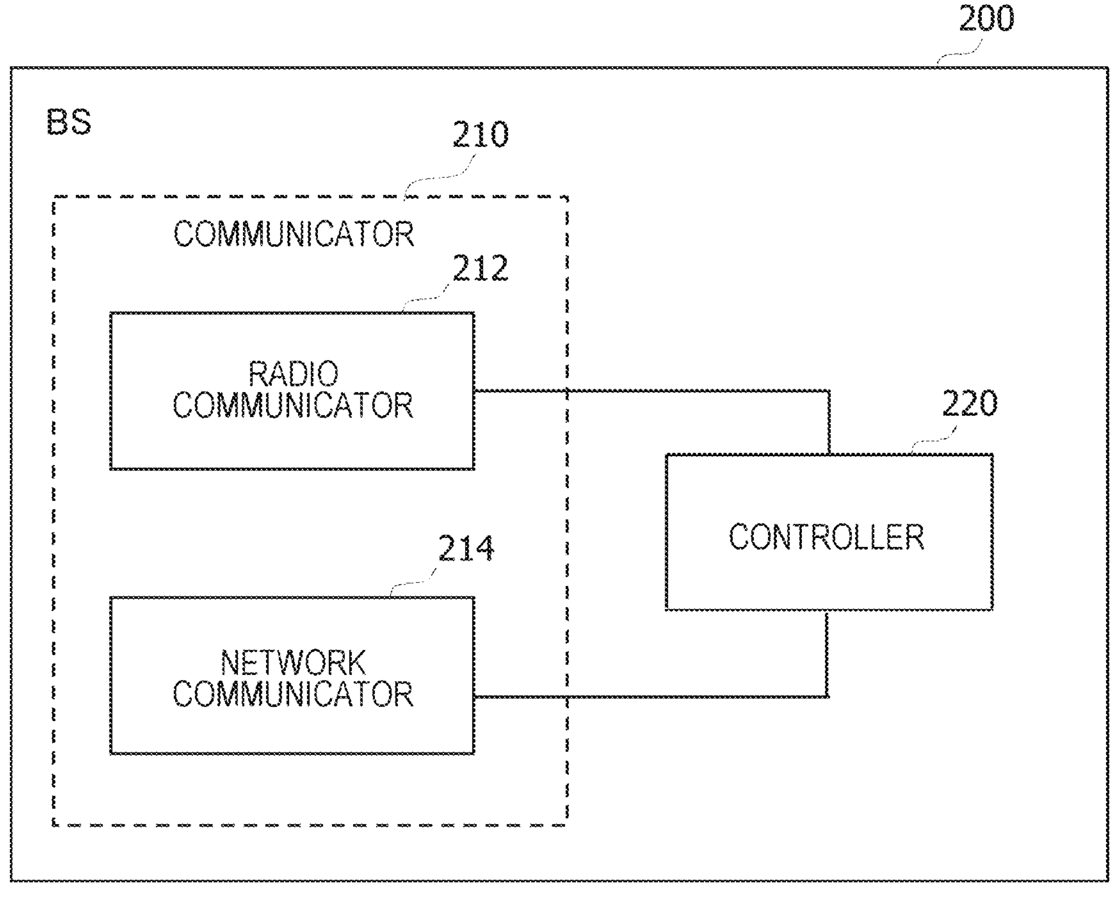
FIG. 3 is a block diagram illustrating an example of a schematic functional configuration of a base station according to an embodiment of the present disclosure.

An example of a configuration of the BS 200 according to the embodiment of the present disclosure will be described with reference to FIG. 3. The BS 200 includes a communicator 210 and a controller 220.

The communicator 210 communicates with other communication apparatuses by transmitting and receiving signals. The communicator 210 includes a radio communicator 212 and a network communicator 214.

The radio communicator 212 transmits and receives signals from the radio communication apparatus. For example, the radio communicator 212 receives a radio signal from the UE 100 and transmits a radio signal to the UE 100. The radio communicator 212 may include one or more receivers that receive radio signals and one or more transmitters that transmit radio signals. The receiver and the transmitter may include an antenna and an RF circuit. The antenna converts a signal into a radio wave and emits the radio wave into space. Furthermore, the antenna receives a radio wave in space and converts the radio wave into a signal. The antenna may include a transmitting antenna and a receiving antenna. The antenna may include an antenna for transmission and reception. The antenna may be a directional antenna. The antenna may include a plurality of antenna elements. The RF circuit performs analog processing of a signal transmitted and received via the antenna. The RF circuit may include a high frequency filter, an amplifier, a modulator, a low pass filter, and the like.

The network communicator 214 transmits and receives signals from a network. The network communicator 214 receives a signal from an adjacent base station connected via an Xn interface which is an inter-base station interface, for example, and transmits the signal to the adjacent base station. Furthermore, the network communicator 214 receives a signal from the core network apparatus 300 connected via the NG interface, for example, and transmits the signal to the core network apparatus 300. The network communicator 214 may include a network interface. The network interface is, for example, a network adapter.

The controller 220 performs various types of control in the BS 200. The controller 220 controls, for example, communication with the UE 100 via the radio communicator 212. Furthermore, the controller 220 controls communication with a node (for example, a network node in a core network, an adjacent base station, or a core network apparatus 300) via the network communicator 214, for example. An operation of the BS 200 to be described later may be an operation under the control of the controller 220.

The controller 220 may include one or more processors capable of executing a program, and a memory that stores the program. The one or more processors may execute the program to perform the operation of the controller 220. The program may be a program for causing the processor to execute the operation of the controller 220.

The processor performs digital processing of signals transmitted and received via the antenna and the RF circuit. The digital processing includes processing of a protocol stack of the RAN. The processor may be a single processor.

The processor may include a plurality of processors. The plurality of processors may include a baseband processor that performs digital processing and one or more processors that perform other processing. The memory stores a program executed by the processor, a parameter related to the program, and data related to the program. The memory may include at least one of a ROM, an EPROM, an EEPROM, a RAM, and a flash memory. All or a part of the memory may be included in the processor.

A part or all of the controller 220 may be virtualized. That is, a part or all of the controller 220 may be implemented as a virtual machine. In this case, a part or all of the controller 220 may operate a physical machine (that is, hardware) including a processor, a memory, and the like and as a virtual machine on a hypervisor.

Note that, hereinafter, the operation of the functional units (the communicator 210 and the controller 220) included in the BS 200 may be described as the operation of the BS 200.

(1.4) BWP (Bandwidth Part)

The UE 100 and the BS 200 perform communication using a BWP (bandwidth part) which is a subset of the total bandwidth of the cell. Specifically, the BS 200 configures one or more BWPs for the UE 100. The BS 200 can notify the UE 100 of the BWP (that is, the active BWP) used for communication with the BS 200 among the configured one or more BWPs. Specifically, the BS 200 can transmit, to the UE 100, an identifier indicating a BWP to be activated at the time of performing the configuration, that is, a BWP to be first used in communication with the BS 200. Furthermore, for control of switching from the active BWP to a BWP that is not the active BWP (hereinafter, inactive BWPs) and switching from the inactive BWP to the active BWP (so-called BWP switching), for example, a physical downlink control channel (for example, downlink assignment, uplink assignment), a timer (that is, bwp-InactivityTimer), RRC signaling, a MAC entity, or the like is used.

The BWP includes an initial BWP and a dedicated BWP. The initial BWP is used at least for initial access of the UE 100. The initial BWP is commonly used by a plurality of UEs 100. The initial BWP includes an initial BWP for downlink communication (hereinafter, initial downlink BWP) and an initial BWP for uplink communication (hereinafter, an initial uplink BWP). A value of the identifier (that is, bwp-id) indicating each of the initial downlink BWP and the initial uplink BWP is 0.

The UE 100 can determine the initial BWP (that is, the initial downlink BWP and the initial uplink BWP) by two methods, for example. In the first method, the UE 100 determines the initial BWP based on CORESET #0 configured using information included in a master information block (MIB) in a physical broadcast channel (PBCH). In the second method, the UE 100 determines the initial BWP based on a frequency domain location and bandwidth configured using information included in a system information block (SIB). For example, the UE 100 may apply the BWP determined by the first method to the communication with the BS 200 until the reception of a message 4 in the random access procedure. For example, after receiving the message 4 (Msg. 4), the UE 100 may apply the BWP determined by the second method to the communication with the BS 200.

The dedicated BWP is dedicatedly configured for the UE 100. The dedicated BWP includes a dedicated BWP for downlink communication (hereinafter, a dedicated downlink BWP (UE dedicated downlink BWP)) and a dedicated BWP for uplink communication (hereinafter, a dedicated uplink BWP (UE dedicated uplink BWP)). A value of the identifier indicating each of the dedicated downlink BWP and the dedicated uplink BWP is other than 0.

In the UE 100, for example, a dedicated BWP is configured on the basis of information (for example, the downlink BWP information (that is, BWP-Downlink) and the uplink BWP information (that is, BWP-Uplink).) included in the RRC message. Each of the information for the downlink BWP and the information for the dedicated uplink BWP may include, for example, at least one of information (for example, locationAndBadwidth) indicating a frequency domain location and bandwidth, information (for example, subcarrierSpacing) indicating a subcarrier spacing, and information (for example, cyclicPrefix) indicating whether an extended cyclic prefix is used.

(1.5) Synchronization Signal and Physical Broadcast Channel Block (SSB)

The SSB includes four OFDM symbols in the time domain and 240 consecutive subcarriers in the frequency domain. The SSB includes a primary synchronization signal (hereinafter, a PSS), a secondary synchronization signal (hereinafter, an SSS), and a physical broadcast channel (PBCH). Each of the PSS and the SSS occupies one OFDM symbol and 127 subcarriers. The PBCH spans three OFDM symbols and 240 subcarriers. The location of the resource element to which the SSB is mapped is specified in the specification.

The BS 200 transmits the SSB in an initial BWP (specifically, an initial downlink BWP). The BS 200 can periodically transmit the SSB. The UE 100 can receive (that is, detects) the SSB transmitted from the BS 200 in the initial downlink BWP, and synchronize the time and/or the frequency.

(1.6) Measurement

The UE 100 can perform measurement based on a radio signal received from the BS 200. For example, the UE 100 measures radio quality (for example, received power (so-called SS reference signal received power (SS-RSRP)), received quality (so-called SS reference signal received quality (SS-RSRQ)), and the like) based on the SSB. Furthermore, the UE 100 may measure the radio quality (for example, received power (so-called CSI reference signal received power (CSI-RSRP)), received quality (so-called CSI reference signal received quality (CSI-RSRQ)), and the like) on the basis of, for example, a channel state information reference signal (hereinafter, CSI-RS). The CSI-RS is transmitted on a resource (hereinafter, a CSI-RS resource) dedicatedly configured in the UE 100. The CSI-RS resource can be configured to both the initial BWP and the dedicated BWP.

The UE 100 may use a measurement result for communication control with the BS 200. Furthermore, the UE 100 may report the measurement result to the BS 200. When performing the measurement based on the SSB, the UE 100 may report, for example, a measurement result for each SSB, a measurement result for each cell based on the SSB, and/or the SSB index. Furthermore, when performing the measurement based on the CSI-RS, the UE 100 may report, for example, a measurement result for each CSI-RS resource, a measurement result for each cell based on the CSI-RS resource, and/or a CSI-RS resource identifier. The UE 100 may report the measurement result periodically or by using a predetermined event as a trigger. The UE 100 may report the measurement result in a physical uplink shared channel (PUSCH) in the uplink BWP, for example.

Note that, when receiving request information of a measurement gap from the UE 100 regarding the measurement (SSB based intra-frequency measurement) based on the SSB at a frequency included in a frequency range of a cell, the BS 200 may configure the measurement gap according to the request information. In a case where the BS 200 has not received the request information from the UE 100 and none of the plurality of BWPs configured for the UE 100 includes the frequency domain resource of the SSB associated with the initial BWP other than the initial BWP, the BS 200 may always provide the configuration of the measurement gap to the UE 100.

(1.7) Uplink Power Control

A UE 100 can use a measurement result for uplink power control, for example, as communication control with a BS 200. For example, the UE 100 calculates the uplink power control of PUSCH by a power equation using a path loss estimation value calculated based on the measurement result. Specifically, when the UE 100 transmits the PUSCH on an active uplink BWP b of a carrier f of a serving cell c by using a PUSCH power control adjustment state with an index 1 and a parameter set configuration with an index j, the UE calculates an uplink transmission power $P_{PUSCHb,f,c}$ (i, j·$q_d$, 1) [dBM] of the PUSCH in a PUSCH transmission occasion i by using, for example, Equation 1 (Math. 1) and Equation 2 (Math. 2) described below.

(Math. 1)

$$P_{PUSCH,b,f,c}(i, j, q_d, l) = \min\left\{\begin{array}{c} P_{CMAX,f,c}(i), \\ P_{O\_PUSCH,b,f,c}(j) + \\ 10\log_{10}\left(2^{\mu}\cdot M_{RB,b,f,c}^{PUSCH}(i)\right) + \alpha_{b,f,c}(j)\cdot \\ PL_{b,f,c}(q_d) + \Delta_{TF,b,f,c}(i) + f_{b,f,c}(i, l) \end{array}\right\} \quad \text{(Equation 1)}$$

(Math. 2)

$$PL_{b,f,c}(q_d) = (referenceSignalPower) - (\text{higher layer filtered } RSRP) \quad \text{(Equation 2)}$$

The "$PL_{b,f,c}$ ($q_d$)" are path loss estimation values calculated by the UE 100. The "referenceSignalPower" is a transmission power value of a reference signal such as an SSB or a CSI-RS. The "higher layer filtered RSRP" is a received power value of a reference signal such as an SSB or a CSI-RS. Details of each parameter in Equations 1 and 2 are defined in TS of the 3GPP standard.

The UE 100 calculates a path loss estimation value based on Equation 2 using the transmission power value of the reference signal and the received power value of the reference signal. The UE 100 can calculate the uplink transmission power used for transmission of the PUSCH based on Equation 1 using the calculated path loss estimation value. Note that, similarly to the PUSCH, the UE 100 can calculate, for example, the uplink transmission power used for transmission of the PUCCH, a sounding reference signal (SRS), and the like by a power equation using a path loss estimation value.

(2) System Operation (2.1) Operation Example 1

Figure 4:
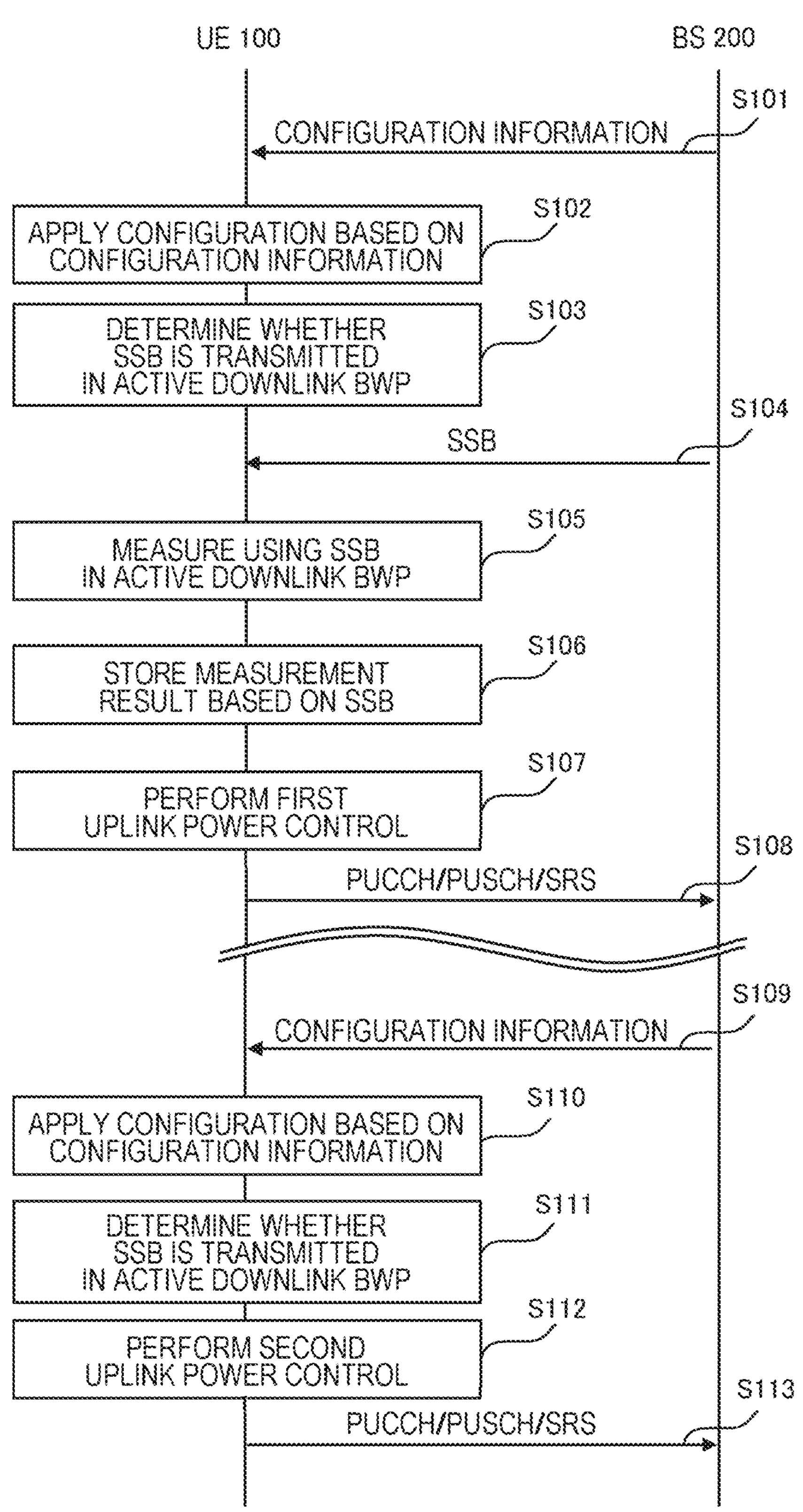
FIG. 4 is a flowchart for explaining an example of a schematic flow of processing according to Operation Example 1 of an embodiment of the present disclosure.

Operation example 1 of the UE 100 and the BS 200 according to the embodiment of the present disclosure will be described with reference to FIG. 4. The UE 100 is located in a serving cell managed by the BS 200. The UE 100 performs communication with the BS 200 by the serving cell.

In step S101, the BS 200 transmits configuration information in order to configure a BWP to the UE 100. The UE 100 receives the configuration information from the BS 200. The BS 200 may transmit the configuration information to the UE 100 using an MIB and/or an SIB (for example, SIB1). The BS 200 may transmit the configuration information to the UE 100 by using dedicated RRC signaling (for example, RRCSetup, RRCResume, RRCReestablishment, and the like).

The configuration information may include information for configuring an initial BWP or information for configuring a dedicated BWP. The BS 200 may transmit the configuration information for configuring the initial BWP using the MIB and/or the SIB. The BS 200 may transmit the configuration information for configuring the dedicated BWP by using the dedicated RRC signaling.

The configuration information may include, for example, at least one of information indicating a frequency domain location and bandwidth (for example, locationAndBadwidth), information indicating a subcarrier spacing (for example, subcarrierSpacing), information indicating whether an extended cyclic prefix is used (for example, cyclicPrefix), information indicating a parameter commonly applied to communication in the initial downlink BWP, and information indicating a parameter commonly applied to communication in the initial uplink BWP. In addition, the configuration information may include information for configuring a dedicated BWP (that is, the dedicated downlink BWP and/or the dedicated uplink BWP). The information for configuring the dedicated BWP may include at least one of information for identifying the BWP (for example, bwp-id), information indicating a parameter commonly applied to communication in the dedicated downlink BWP, information indicating a parameter dedicatedly applied to communication in the dedicated downlink BWP, information indicating a parameter commonly applied to communication in the dedicated uplink BWP, and information indicating a parameter dedicatedly applied to communication in the dedicated uplink BWP.

The configuration information may include a correction value used when second power control to be described later is performed. The BS 200 may transmit the correction value to the UE 100 together with the configuration information for configuring the BWP, or may transmit the correction value to the UE 100 separately from the configuration information for configuring the BWP. The UE 100 may receive the correction value from the BS 200. For example, the correction value may be configured for each channel and signal type used for uplink communication in the active uplink BWP corresponding to the active downlink BWP in which the SSB is not transmitted.

The correction value may be, for example, a value commonly configured for each channel and signal type used for uplink communication in the active uplink BWP. Specifically, the correction value may be one common value used when calculating the uplink transmission power of the PUCCH. Therefore, for example, as indicated by a dotted frame in FIG. 5, one correction value for the PUCCH (for example, powerOffsetNonSSB-BWP) may be included in the configuration information used to configure a UE-specific parameter for power control of the PUCCH (for example, PUCCH-PowerControl). In addition, one common value used when calculating the uplink transmission power of the PUSCH may be used. Therefore, for example, as indicated by a dotted frame in FIG. 6, one correction value for the PUSCH may be included in the configuration information used to configure a UE-specific power control parameter for the PUSCH (for example, PUSCH-PowerControl). In addition, one common value used when calculating the uplink transmission power of the SRS may be used. Therefore, for example, as indicated by a dotted frame in FIG. 7, one correction value for the SRS may be included in the configuration information used to configure the SRS transmission (for example, SRS-Config).

For example, a plurality of correction values may be configured for each channel and signal type used for uplink communication in the active uplink BWP. Each of the plurality of correction values may be associated with an identifier identifying the SSB. Therefore, for example, as indicated by a dotted frame in FIG. 8, the configuration information used to configure the UE-specific parameter for power control of the PUCCH may include a plurality of correction values for the PUCCH and an identifier for identifying the SSB associated with each of the plurality of correction values (for example, ssb-Index). In addition, for example, as indicated by a dotted frame in FIG. 9, the configuration information used to configure the UE-specific power control parameter for the PUSCH may include a plurality of correction values for the PUSCH and an identifier for identifying the SSB associated with each of the plurality of correction values. Furthermore, for example, as indicated by a dotted frame in FIG. 10, the configuration information used to configure the SRS transmission may include a plurality of correction values for the SRS and an identifier for identifying the SSB associated with each of the plurality of correction values.

For example, a plurality of correction values may be configured for each channel and signal type used for uplink communication in the active uplink BWP. Each of the plurality of correction values may be associated with an identifier identifying the BWP. Therefore, for example, the configuration information used to configure the UE-specific parameter for power control of the PUCCH may include a plurality of correction values for the PUCCH and an identifier for identifying the BWP associated with each of the plurality of correction values. In addition, for example, the configuration information used to configure the UE-specific power control parameter for the PUSCH may include a plurality of correction values for the PUSCH and an identifier for identifying the BWP associated with each of the plurality of correction values. Furthermore, for example, the configuration information used to configure the SRS transmission may include a plurality of correction values for the SRS and an identifier for identifying the BWP associated with each of the plurality of correction values.

The configuration information may include configuration information for measuring the SSB. The configuration information may include, for example, information indicating a frequency in which the SSB is transmitted (for example, an absolute radio frequency channel number (ARFCN) or the like) as the information indicating a measurement object.

The configuration information may include information indicating a transmission power value of the SSB (for example, ss-PBCH-BlockPower). The transmission power value of the SSB is, for example, an average EPFR (Energy per Resource Element) of resource elements that carry an SSS in a unit of dBm that the network used for SSB transmission. For example, the BS 200 may transmit the information indicating the transmission power value of the SSB by the SIB1 in step S101 or at a timing different from step S101.

Note that, in a case where the frequency domain resource of the SSB associated with the initial BWP is not included in any of the plurality of BWPs dedicatedly configured for the UE 100 other than the initial BWP, the BS 200 may determine whether or not the UE 100 supports communication in the BWP in which the SSB is not transmitted. For example, the BS 200 can determine whether or not the UE 100 supports communication in the BWP in which the SSB is not transmitted on the basis of capability information received from the UE 100. For example, in a case where the capability information received from the UE 100 includes information indicating support of a BWP operation without bandwidth restriction (for example, bwp-WithoutRestriction), the BS 200 may determine that the UE 100 supports communication in the BWP in which the SSB is not transmitted. In this case, the BS 200 may configure the BWP in which the SSB is not transmitted to the UE 100. Note that the bandwidth restriction means, for example, that the SSB may not be transmitted in the bandwidth of the downlink BWP dedicatedly configured for the UE 100.

When determining that the UE 100 does not support communication in the BWP in which the SSB is not transmitted, the BS 200 may always provide the configuration of the measurement gap to the UE 100. On the other hand, when determining that the UE 100 supports communication in the BWP in which the SSB is not transmitted, the BS 200 may omit the configuration of the measurement gap for the UE 100.

Note that, in a case where the downlink BWP dedicatedly configured for the UE 100 includes the dedicated downlink BWP in which the SSB is not transmitted, the BS 200 may configure, in the UE 100, measurement using the CSI-RS resource included in the dedicated downlink BWP in which the SSB is not transmitted. The BS 200 may transmit the configuration information of the measurement to the UE 100 together with the BWP-related information. The BS 200 may transmit the measurement configuration information to the UE 100 separately from the BWP-related information.

In step S102, the UE 100 applies the configuration based on the configuration information received in step S101 in order to communicate with the BS 200 in the BWP. The UE 100 can determine, based on the configuration information, the BWP to be used as an active BWP among the configured one or more BWPs. For example, when the UE 100 performs communication with the BS 200 by using time division duplex (Time Division Duplex (TDD)), the center frequency of the active downlink BWP and the center frequency of the active uplink BWP may coincide with each other. When the UE 100 performs communication with the BS 200 by using frequency division duplex (Frequency Division Duplex (FDD)), the center frequency of the active downlink BWP and the center frequency of the active uplink BWP may coincide with each other or may be different from each other. The bandwidth of the active downlink BWP and the bandwidth of the active uplink BWP may coincide with each other or may be different from each other. When the active uplink BWP and the active downlink BWP have the same center frequency, the active uplink BWP and the active downlink BWP correspond to each other.

In step S103, the UE 100 determines whether or not the SSB is transmitted in the active BWP, specifically, the downlink BWP (hereinafter, the active downlink BWP) configured as the active BWP. That is, the UE 100 determines whether or not the active downlink BWP includes the SSB of the serving cell. When determining that the SSB is transmitted in the active downlink BWP, the UE 100 executes processing of step S105. On the other hand, when determining that the SSB is not transmitted in the active downlink BWP, the UE 100 may omit the measurement using the SSB.

For example, in a case where the active downlink BWP is the initial BWP, the UE 100 determines that the SSB is transmitted in the active downlink BWP. Furthermore, for example, in a case where the frequency at which the SSB is transmitted is included in the active downlink BWP, the UE 100 may determine that the SSB is transmitted in the active downlink BWP based on the information indicating the frequency at which the SSB is transmitted. On the other hand, in a case where the frequency at which the SSB is transmitted is not included in the active downlink BWP, the UE 100 determines that the SSB is not transmitted in the active downlink BWP.

For example, in a case where the UE 100 is a RedCap UE having the capability of supporting the BWP operation without bandwidth restriction, the UE 100 may determine whether the SSB is transmitted in the active downlink BWP. In a case where the UE 100 is a RedCap UE that does not have the capability of supporting the BWP operation without bandwidth restriction, or in a case where the UE 100 is a UE other than the RedCap UE, the UE 100 may perform the measurement according to the measurement configuration from the BS 200 without determining whether the SSB is transmitted in the active downlink BWP.

In a case where it is determined that the SSB is transmitted in the active downlink BWP, that is, in a case where the active downlink BWP includes the SSB of the serving cell, the UE 100 configures the measurement of the SSB to enable and performs the measurement of the serving cell. On the other hand, in a case where it is determined that the SSB is not transmitted in the active downlink BWP, that is, in a case where the active downlink BWP does not include the SSB of the serving cell, the UE 100 configures the measurement of the SSB to disable and omits the measurement. That is, the UE 100 does not measure the serving cell. Furthermore, in a case where the UE 100 is a RedCap UE having the capability of supporting the BWP operation without bandwidth restriction, and the active downlink BWP does not include the SSB of the serving cell, the UE 100 does not need to perform the measurement of the serving cell.

In the present operation example, the description will proceed on the assumption that the UE 100 determines that the SSB is transmitted in the active downlink BWP. That is, the active downlink BWP is a BWP in which the SSB is transmitted from the BS 200 (hereinafter, appropriately referred to as a BWP with SSB).

In step S104, the BS 200 transmits the SSB in the serving cell. Specifically, the BS 200 transmits the SSB to the UE 100 in the configured active downlink BWP.

In step S105, the UE 100 performs measurement using the SSB in the active downlink BWP. The UE 100 performs measurement of the radio quality using, for example, the SSB. The radio quality is, for example, received power of the SSB, received quality of the SSB, and the like. When the UE 100 is not the RedCap UE having a capability of supporting the BWP operation without bandwidth restriction, the measurement for the serving cell may be performed according to the measurement configuration from the BS 200.

In step S106, when the BWP with SSB is the active BWP, the UE 100 stores the measurement result obtained by performing measurement relative to the SSB. The UE 100 stores, for example, the received power value of the SSB obtained by the measurement.

In step S107, the UE 100 performs first uplink power control for calculating the uplink transmission power on the active uplink BWP using the path loss estimation value calculated from the measurement result of the received power relative to the SSB. Specifically, the UE 100 calculates the uplink transmission power of the PUSCH using, for example, Equations 1 and 2 described above. More specifically, first, the UE 100 can calculate the path loss estimation value based on Equation 2 using the transmission power value of the SSB and the received power value of the SSB. Second, the UE 100 can calculate the uplink transmission power based on Equation 1 using the calculated path loss estimation value.

Note that the UE 100 may similarly calculate the uplink transmission power of a channel or a signal used for other uplink communication. For example, similarly to the PUSCH, the UE 100 may calculate the uplink transmission power used for transmission of the PUCCH or the SRS used for the uplink communication.

In addition, the UE 100 may store the path loss estimation value calculated based on the received power of the SSB as the measurement result. The UE 100 may store the calculated uplink transmission power.

In step S108, the UE 100 performs the uplink communication with the BS 200 in the active uplink BWP with the uplink transmission power calculated in step S107. The UE 100 transmits, for example, at least one of the PUCCH, the PUSCH, and the SRS to the BS 200 with the calculated uplink transmission power. The BS 200 receives at least one of the PUCCH, the PUSCH, and the SRS from the UE 100. Note that the active uplink BWP corresponds to the active downlink BWP in which the SSB used for measurement is transmitted.

Thereafter, the UE 100 and the BS 200 may perform communication using the active uplink BWP and the active downlink BWP. The BS 200 may periodically transmit the SSB in the active downlink BWP. The UE 100 may perform the measurement based on the SSB each time the SSB is received from the BS 200. The UE 100 may update the held measurement result with a new measurement result obtained by the measurement. The UE 100 may perform the first uplink power control each time the measurement result is updated.

In step S109, the BS 200 transmits configuration information in order to configure the BWP for the UE 100. The BS 200 may transmit the configuration information to the UE 100 using the dedicated RRC signaling in the active downlink BWP. The UE 100 receives the configuration information from the BS 200. The configuration information may include information similar to that in step S101.

The configuration information may include control information for switching the active BWP. The control information may be, for example, information specifying the active BWP. In the present operation example, the control information is information for switching the active BWP from the BWP with SSB to the BWP in which the SSB is transmitted from the BS 200 (hereinafter, appropriately referred to as a BWP without SSB).

In step S110, the UE 100 applies the configuration based on the configuration information received in step S109. The UE 100 may switch the active BWP from the BWP with SSB to the BWP without SSB according to the application of the configuration based on the control information from the BS 200. For example, in accordance with the control information, the UE 100 changes the BWP used for communication until immediately before the configuration is applied from the active BWP to an inactive BWP, and changes the BWP designated as the active BWP from the inactive BWP to the active BWP. When performing communication with the BS 200 by using the TDD, the UE 100 switches the BWP so that the center frequency of the active downlink BWP and the center frequency of the active uplink BWP coincide with each other. In addition, when performing communication with the BS 200 using the FDD, the UE 100 may or may not allow the center frequency of the active downlink BWP and the center frequency of the active uplink BWP to coincide with each other by switching of the BWP.

Step S111 corresponds to step S103. In the present operation example, the UE 100 determines that the SSB is not transmitted in the active downlink BWP. Therefore, in the following description, the active downlink BWP is a BWP without SSB.

In step S112, the UE 100 performs second uplink power control for calculating the path loss estimation value or the uplink transmission power in the first uplink power control. That is, the UE 100 may correct the path loss estimation value in the first uplink power control, and may correct the uplink transmission power in the first uplink power control. Hereinafter, a case where the UE 100 calculates the uplink transmission power of the PUSCH will be mainly described. The UE 100 may similarly calculate the uplink transmission power of a channel or a signal used for other uplink communication.

First, a case of correcting the path loss estimation value in the first uplink power control will be described. In the second power control, the UE 100 may calculate the path loss estimation value using the transmission power value of the SSB, the received power value of the SSB, and the correction value for correcting the transmission power value of the SSB or the received power value of the SSB. The received power value of the SSB is included in the measurement result held in step S106. The correction value may be, for example, a value that offsets the transmission power value of the SSB or a value that offsets the received power value of the SSB. The UE 100 can calculate the path loss estimation value using, for example, the following Equation 3 (Math. 3). As a result, the UE 100 can obtain the corrected path loss estimation value.

(Math. 3)

$$PL_{b,f,c}(q_d) = (\text{referenceSignalPower}) + (powerOffsetNonSSB-BWP) - (\text{higher layer filtered } RSRP) \quad \text{(Equation 3)}$$

The "powerOffsetNonSSB-BWP" is a correction value. The "powerOffsetNonSSB-BWP" is applied to derive the path loss estimation value. The "powerOffsetNonSSB-BWP" may provide, for example, a power offset of the active downlink BWP in which an SSB associated to the initial downlink BWP is not transmitted in a unit of dB. The "powerOffsetNonSSB-BWP" may be provided by an upper layer.

The UE 100 can calculate the uplink transmission power of the PUSCH based on Equation 1 using the corrected path loss estimation value. Since the path loss estimation value is corrected, the calculated uplink transmission power is corrected from the uplink transmission power calculated in step S107.

Second, a case of correcting the uplink transmission power in the first uplink power control will be described. In the second power control, the UE 100 may calculate the uplink power control using the correction value for correcting the uplink transmission power calculated in the first uplink power control. For example, in the second power control, the UE 100 may calculate the uplink transmission power using the path loss estimation value calculated in the first power control and the correction value for correcting the path loss estimation value. The correction value may be, for example, a coefficient multiplied by the path loss estimation value. In addition, for the correction value, a new term may be added as an offset value for correcting the path loss estimation value in the equation of the uplink transmission power in the first power control. The UE 100 can correct the uplink transmission power in the first uplink power control by using the path loss estimation value calculated in the first power control.

Note that the UE 100 may use the correction value corresponding to the channel or signal type to be transmitted in step S113. In addition, when the correction value and the identifier for identifying the SSB are associated with each other, the UE 100 may use the correction value associated with the identifier for identifying the SSB used for the measurement. Furthermore, when the correction value and the identifier for identifying the BWP are associated with each other, the UE 100 may use the correction value associated with the identifier for identifying the BWP corresponding to the current active uplink BWP.

Note that the UE 100 may perform the second uplink power control in a case where the UE 100 is a RedCap UE having a capability of supporting the BWP operation without bandwidth restriction. In a case where the UE 100 is not such the RedCap UE, for example, the UE 100 may request configuration information for performing communication with the BS 200 in the BWP with SSB to the BS 200.

In addition, when the (periodic) reception of the CSI-RS to be transmitted in the active downlink BWP in which the SSB is not transmitted is not configured in the UE 100, the UE 100 may perform the second power control using the measurement result obtained by the measurement while the BWP with SSB is the active BWP, that is, the measurement result obtained in step S105. When the (periodic) reception of the CSI-RS transmitted in the active downlink BWP in which the SSB is not transmitted is configured in the UE 100, the UE 100 may execute operation example 2 described later.

In step S113, similarly to step S108, the UE 100 performs the uplink communication with the BS 200 in the active uplink BWP with the uplink transmission power calculated in step S112.

As described above, the UE 100 (communicator 110) performs communication using the active downlink BWP used for the downlink communication with the BS 200 and the active uplink BWP used for the uplink communication with the BS 200. When the SSB is transmitted from the BS 200 in the active downlink BWP, the UE 100 (controller 120) performs the first uplink power control for calculating the uplink transmission power on the active uplink BWP by using the path loss estimation value calculated based on the measurement result of the received power for the BS 200. When the SSB is not transmitted in the active downlink BWP, the UE 100 (controller 120) performs the second uplink power control for correcting the calculation of the uplink transmission power or the path loss estimation value in the first uplink power control. As a result, even when the SSB is not transmitted in the active downlink BWP corresponding to the active uplink BWP, and the UE 100 cannot calculate the path loss estimation value, it is possible to suppress the occurrence that the path loss estimation value used for calculation of the uplink transmission power is greatly deviated from the actual path loss estimation value by using the measured received power measurement result. Alternatively, since the value corrected from the first uplink transmission power by the correction value is the second uplink transmission power, the uplink transmission power can be appropriately calculated.

In addition, the UE 100 (controller 120) may calculate the path loss estimation value using the transmission power value of the SSB, the received power value of the SSB, and the correction value for correcting the transmission power value of the SSB or the received power value of the SSB in the second uplink power control. It is possible to suppress the occurrence that the path loss estimation value used for calculation of the uplink transmission power is greatly deviated from the actual path loss estimation value. As a result, the UE 100 can appropriately calculate the uplink transmission power.

In addition, the UE 100 (controller 120) may calculate the uplink transmission power using the path loss estimation value and the correction value for correcting the path loss estimation value in the second uplink power control. As a result, the UE 100 corrects the path loss estimation value calculated in the first uplink power control with the correction value, so that the occurrence that the path loss estimation value used for calculating the uplink transmission power is greatly deviated from the actual path loss estimation value can be suppressed. As a result, the UE 100 can appropriately calculate the uplink transmission power.

In addition, the UE 100 (communicator 110) may receive the correction value used for correction in the second uplink power control from the base station. Since the BS 200 can designate the correction value, it is possible to control the uplink transmission power on the active uplink BWP corresponding to the active downlink BWP in which the SSB is not transmitted.

In addition, the correction value may be configured for each channel and signal type used for the uplink communication in the active uplink BWP corresponding to the active downlink BWP in which the SSB is not transmitted. Since the UE 100 can use the correction value configured for each channel and signal type used for the uplink communication, the uplink transmission power can be calculated more appropriately.

Furthermore, the correction value may be a value commonly configured for each channel and signal type. When performing the uplink communication using the same type of channel or the same type of signal, the UE 100 does not need to change the correction value, so that the load of the UE 100 can be reduced.

Furthermore, a plurality of correction values may be configured for each channel and signal type. Each of the plurality of correction values may be associated with an identifier identifying the SSB. Since the BS 200 can configure the correction value for each identifier identifying the SSB, the UE 100 can calculate the uplink transmission power more appropriately.

Furthermore, a plurality of correction values may be configured for each channel and signal type. Each of the plurality of correction values may be associated with an identifier identifying the BWP. Since the BS 200 can configure the correction value for each identifier identifying the BWP, the UE 100 can calculate the uplink transmission power more appropriately.

(2.2) Operation Example 2

Figure 11:
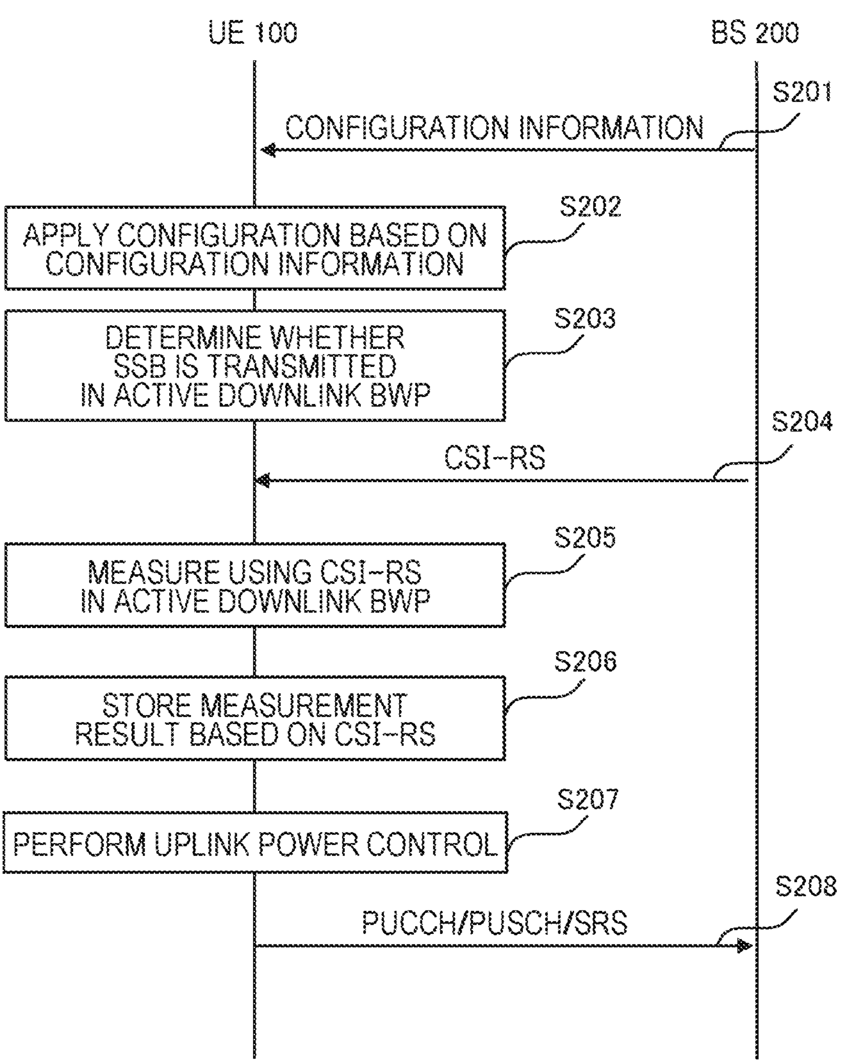
FIG. 11 is a flowchart for explaining an example of a schematic flow of processing according to operation example 2 of the embodiment of the present disclosure.

Operation example 2 of the UE 100 and the BS 200 according to the embodiment of the present disclosure will be described with reference to FIG. 11. The differences from the above descriptions will be mainly described. In operation example 2, an example of an operation in which the UE 100 calculates the uplink transmission power using the measurement result of the CSI-RS will be described.

Steps S201 to S203 correspond to steps S101 to S103.

In step S201, the configuration information may include configuration information for configuring measurement using the CSI-RS. Alternatively, the BS 200 may transmit configuration information for configuring measurement using the CSI-RS to the UE 100 separately from the configuration information in step S201. The UE 100 applies the configuration of measurement using the CSI-RS based on the configuration information.

The configuration information for configuring measurement using the CSI-RS may include information for determining the transmission power value of the CSI-RS (for example, powerControlOffsetSS). The information for determining the transmission power value of the CSI-RS may be, for example, an offset value for calculating the transmission power value of the CSI-RS from the transmission power value of the SSB. The UE 100 can determine a value offset from the transmission power value of the SSB by the offset value as the transmission power value of the CSI-RS. For example, when the initial BWP is the active BWP, the UE 100 may measure the received power of the SSB to be transmitted in the active BWP and may store the measured received power.

In step S203, in the present operation example, the description will proceed on the assumption that the UE 100 determines that the SSB is not transmitted in the active downlink BWP.

In step S204, the BS 200 transmits the CSI-RS for the UE 100 using the CSI-RS resource configured to the UE 100. Note that the CSI-RS resource is included in the active downlink BWP configured to the UE 100.

In step S205, the UE 100 performs measurement using the SSB in the active downlink BWP. The UE 100 performs measurement of the radio quality using the CSI-RS. The radio quality is, for example, received power of the CSI-RS, received quality of the CSI-RS, and the like.

In step S206, the UE 100 stores the measurement result based on the CSI-RS. The UE 100 stores, for example, the received power value of the CSI-RS obtained by the measurement.

In step S207, the UE 100 performs the uplink power control for calculating the uplink transmission power on the active uplink BWP using the path loss estimation value calculated based on the measurement result of the received power relative to the CSI-RS. Specifically, the UE 100 calculates the uplink transmission power of the PUSCH using, for example, Equations 1 and 2 described above. First, the UE 100 can calculate the path loss estimation value based on Equation 2 by using the transmission power value of the CSI-RS and the received power value of the CSI-RS. Second, the UE 100 can calculate the uplink transmission power based on Equation 1 using the calculated path loss estimation value.

Note that the UE 100 may similarly calculate the uplink transmission power of a channel or a signal used for other uplink communication. For example, similarly to the PUSCH, the UE 100 may calculate the uplink transmission power used for transmission of the PUCCH or the SRS used for the uplink communication.

In step S208, the UE 100 performs the uplink communication with the BS 200 in the active uplink BWP with the uplink transmission power calculated in step S207. The UE 100 transmits, for example, at least one of the PUCCH, the PUSCH, and the SRS to the BS 200. The BS 200 receives at least one of the PUCCH, the PUSCH, and the SRS from the UE 100. Thereafter, the UE 100 and the BS 200 may perform communication using the active uplink BWP and the active downlink BWP.

As described above, when the measurement of the CSI-RS for the UE 100 is configured in the active downlink BWP, the UE 100 (controller 120) may perform measurement in the active downlink BWP. When the SSB is not transmitted in the active downlink BWP in which the measured CSI-RS is transmitted, the UE 100 (controller 120) may calculate the uplink transmission power by using the measurement result of the CSI-RS without performing the second uplink power control. Accordingly, even when the SSB is not transmitted in the active downlink BWP, the UE 100 can appropriately calculate the path loss estimation value by using the measurement result of the CSI-RS transmitted in the active downlink BWP. As a result, the UE 100 can appropriately calculate the uplink transmission power.

Other Embodiments

Although the embodiments of the present disclosure have been described above, the present disclosure is not limited to the embodiments. For example, one correction value which is used regardless of the channel and signal type used for the uplink communication in the active uplink BWP may be applied. Alternatively, a plurality of correction values which are used regardless of the channel and signal type used for the uplink communication in the active uplink BWP may be applied. Each of the plurality of correction values may be associated with an identifier identifying the BWP. In addition, each of the plurality of correction values may be associated with an identifier for identifying the SSB.

In addition, in each operation example described above, the UE 100 receives the correction value from the BS 200, but the configuration is not limited thereto. A correction value may be configured in the UE 100 in advance. Therefore, the UE 100 does not need to receive the correction value from the BS 200 that performs communication using the BWP.

In addition, in each operation example described above, the RRC signaling is applied as an example of the control of the BWP switching in which the UE 100 switches the active BWPs, but the configuration is not limited thereto. A PDCCH, a timer (that is, bwp-InactivityTimer), or a MAC entity may be applied to control the BWP switching. Therefore, the BS 200 may transmit the control information for switching the active BWPs to the UE 100 using, for example, the PDCCH.

Each operation example described above is not limited to the case of being separately and independently performed, and each operation example can be appropriately combined and performed. Furthermore, for example, the steps in the processing described in the present specification do not necessarily need to be executed in time series in the order described in the flowchart or the sequence diagram. For example, the steps in the processing may be executed in an order different from the order described as the flowchart or the sequence diagram, or may be executed in parallel. Furthermore, some of the steps in the processing may be deleted, and further steps may be added to the processing. Moreover, each operation flow described above is not limited to be separately and independently implemented, and can be implemented by combining two or more operation flows. For example, some steps of one operation flow may be added to another operation flow, or some steps of one operation flow may be replaced with some steps of another operation flow.

For example, a method may be provided that includes operation of one or more components of the apparatus described herein, and a program may be provided to cause a computer to perform the operation of the components. Furthermore, a non-transitory tangible computer-readable storage medium on which the program is recorded may be provided. Such methods, programs, and a non-transitory tangible computer-readable storage medium (non-transitory tangible computer-readable storage medium) are also included in the present disclosure. Furthermore, at least a part of the UE 100 or at least a part of the BS 200 may be a chip set or a SoC (System on Chip) in which circuits that execute respective processing performed by the UE 100 or the BS 200 are integrated.

In the present disclosure, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in the protocol stack used for reception, or may mean to physically receive signals wirelessly or by wire. Alternatively, "receive" may mean a combination of performing the processing of at least one layer and physically receiving a signal wirelessly or by wire.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

The invention claimed is:

1. A communication apparatus comprising:

a receiver configured to receive, from a base station, a radio resource control (RRC) message including information for configuring a downlink bandwidth part (BWP), an identifier indicating the downlink BWP used as an active downlink BWP, and an identifier indicating an uplink BWP used as an active uplink BWP, the information for configuring the downlink BWP including information indicating a dedicated parameter used for the active downlink BWP and information indicating an absolute radio frequency channel number (ARFCN) of a synchronization signal and a physical broadcast channel block (SSB) within the active downlink BWP, wherein the identifier indicating the downlink BWP indicates the downlink BWP to be activated upon performing configuration of the downlink BWP; and a controller configured to calculate, by using a path loss estimation value, transmission power of uplink transmission on the active uplink BWP, the path loss estimation value being calculated based on received power relative to the SSB, in a case where a transmission of the SSB within the active downlink BWP is indicated by using the information indicating the ARFCN of the SSB.

2. The communication apparatus according to claim 1, wherein:

the receiver is configured to receive, from the base station, the information for configuring the downlink BWP including information indicating a frequency domain location and bandwidth of the active downlink BWP, and the transmission of the SSB is indicated by using the information indicating the ARFCN of the SSB so that the SSB is transmitted within a bandwidth of the active downlink BWP which is configured based on the information indicating the frequency domain location and bandwidth.

3. The communication apparatus according to claim 1, wherein the transmission power of the uplink transmission is at least one of transmission power for a physical uplink shared channel, transmission power for a physical uplink control channel, and transmission power for a sounding reference signal.

4. A base station comprising:

a transmitter configured to transmit, to a communication apparatus, a radio resource control (RRC) message including information for configuring a downlink bandwidth part (BWP), an identifier indicating the downlink BWP used as an active downlink BWP, and an identifier indicating an uplink BWP used as an active uplink BWP, the information for configuring the downlink BWP including information indicating a dedicated parameter used for the active downlink BWP and information indicating an absolute radio frequency channel number (ARFCN) of a synchronization signal and a physical broadcast channel block (SSB) within the active downlink BWP, wherein the identifier indicating the downlink BWP indicates the downlink BWP to be activated upon performing configuration of the downlink BWP; and a receiver configured to receive, from the communication apparatus, an uplink signal transmitted on the active uplink BWP with transmission power of uplink transmission calculated by using a path loss estimation value calculated based on received power relative to the SSB, in a case where a transmission of the SSB within the active downlink BWP is indicated by using the information indicating the ARFCN of the SSB.

5. The base station according to claim 4, wherein the transmitter is configured to transmit, to the communication apparatus, the information for configuring the downlink BWP including information indicating a frequency domain location and bandwidth of the active downlink BWP, and the transmission of the SSB is indicated by using the information indicating the ARFCN of the SSB so that the SSB is transmitted within a bandwidth of the active downlink BWP, which is configured based on the information indicating the frequency domain location and bandwidth.

6. The base station according to claim 4, wherein the transmission power of the uplink transmission is at least one of transmission power for a physical uplink shared channel, transmission power for a physical uplink control channel, and transmission power for a sounding reference signal.

7. A communication method executed by a communication apparatus comprising:

receiving, from a base station, a radio resource control (RRC) message including information for configuring a downlink bandwidth part (BWP), an identifier indicating the downlink BWP used as an active downlink BWP, and an identifier indicating an uplink BWP used as an active uplink BWP, the information for configuring the downlink BWP including information indicating a dedicated parameter used for the active downlink BWP, and information indicating an absolute radio frequency channel number (ARFCN) of a synchronization signal and a physical broadcast channel block (SSB) within the active downlink BWP, wherein the identifier indicating the downlink BWP indicates the downlink BWP to be activated upon performing configuration of the downlink BWP; and calculating, by using a path loss estimation value, transmission power of uplink transmission on the active uplink BWP, the path loss estimation value being calculated based on received power relative to the SSB, in a case where a transmission of the SSB within the active downlink BWP is indicated by using the information indicating the ARFCN of the SSB.

8. The communication method according to claim 7, further comprising:

receiving, from the base station, the information for configuring the downlink BWP including information indicating a frequency domain location and bandwidth of the active downlink BWP, wherein the transmission of the SSB is indicated by using the information indicating the ARFCN of the SSB so that the SSB is transmitted within a bandwidth of the active downlink BWP which is configured based on the information indicating the frequency domain location and bandwidth.

9. The communication method according to claim 7, wherein the transmission power of the uplink transmission is at least one of transmission power for a physical uplink shared channel, transmission power for a physical uplink control channel, and transmission power for a sounding reference signal.

* * * * *